(12) United States Patent
Das et al.

(10) Patent No.: US 9,873,761 B1
(45) Date of Patent: *Jan. 23, 2018

(54) HIGH TEMPERATURE THREE-DIMENSIONAL PRINTING COMPOSITIONS

(71) Applicant: NOVOSET, LLC, Peapack, NJ (US)

(72) Inventors: Sajal Das, Bedminster, NJ (US); Christopher N. Das, Bedminster, NJ (US); Patrick Shipman, Stirling, NJ (US); Benjamin G. Baxter, Far Hills, NJ (US)

(73) Assignee: Novoset, LLC, Peapack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,613

(22) Filed: Feb. 16, 2017

Related U.S. Application Data

(63) Continuation of application No. 14/756,942, filed on Oct. 30, 2015, now Pat. No. 9,708,440.

(60) Provisional application No. 62/181,226, filed on Jun. 18, 2015.

(51) Int. Cl.

| | | |
|---|---|---|
| *C08F 2/46* | (2006.01) | |
| *C08F 2/50* | (2006.01) | |
| *C08G 61/04* | (2006.01) | |
| *C08G 59/14* | (2006.01) | |
| *C08G 73/12* | (2006.01) | |
| *C08G 63/91* | (2006.01) | |
| *B33Y 70/00* | (2015.01) | |
| *B33Y 80/00* | (2015.01) | |

(52) U.S. Cl.
CPC .......... *C08G 59/1477* (2013.01); *B33Y 70/00* (2014.12); *C08G 63/91* (2013.01); *C08G 73/128* (2013.01); *B33Y 80/00* (2014.12)

(58) Field of Classification Search
CPC .......... C08G 59/1477; C08G 73/0672; C08G 14/06; C08G 65/485; C08G 73/128; C08G 59/4014; C08K 3/04; C08K 3/36; C08K 3/40; C08K 5/1539; C08L 79/04; C08L 63/00; C08L 85/02; C08L 65/02; C08L 79/085; C08L 61/14; C08L 61/34; C08L 79/08; B33Y 70/00; B29C 67/00
USPC .............. 522/83, 71, 189, 184, 1, 6; 520/1
See application file for complete search history.

(56) References Cited

U.S. PATENT DOCUMENTS

| | | | |
|---|---|---|---|
| 5,021,519 A * | 6/1991 | Varde | C08L 63/00 428/163 |
| 6,632,893 B2 | 10/2003 | Konarski et al. | 525/523 |
| 8,603,612 B2 | 12/2013 | Copra et al. | 428/195.1 |
| 9,708,440 B2 * | 7/2017 | Das | C08G 59/1477 |
| 2003/0083397 A1 * | 5/2003 | Bradford | C08F 283/006 522/173 |
| 2008/0103226 A1 * | 5/2008 | Xu | C08G 59/22 522/130 |
| 2009/0061215 A1 | 3/2009 | Baumgart | 428/336 |
| 2012/0172483 A1 * | 7/2012 | Nakamura | C08G 59/68 522/170 |
| 2014/0065378 A1 | 3/2014 | Xu | 428/195.1 |
| 2014/0239527 A1 | 8/2014 | Lee | 264/17 |
| 2015/0064299 A1 | 3/2015 | Koreis | 425/375 |

FOREIGN PATENT DOCUMENTS

| | | | | |
|---|---|---|---|---|
| WO | WO2012015604 | 2/2012 | | C08K 5/35 |
| WO | WO2014077848 | 5/2014 | | C09D 11/00 |

* cited by examiner

*Primary Examiner* — Jessica Whiteley
(74) *Attorney, Agent, or Firm* — Ernest D. Buff & Associates, LLC; Ernest D. Buff, Esq.; Margaret A. LeCroix, Esq.

(57) ABSTRACT

A thermosetting resin composition has particular applications in three dimensional (3-D) printing. The thermosetting resin composition exhibits high performance and is characterized by a high temperature two stage cure resin composition. The thermosetting resin composition comprises cyanate esters and other high temperature resins, photo curable monomers, photo initiator, metal catalyst or ionic liquid catalyst. The thermosetting resin composition cures at room temperature to form 3-D objects and upon further post cure these objects exhibit high temperature properties enabling use at temperatures exceeding 150 C.

31 Claims, 2 Drawing Sheets

HIGH TEMPERATURE THREE-DIMENSIONAL PRINTING COMPOSITIONS

CROSS-REFERENCE TO RELATED APPLICATIONS

This application is a continuation of Applicant's co-pending U.S. patent application Ser. No. 14/756,942, entitled "High Temperature Three-Dimensional Printing Compositions", filed on Oct. 30, 2015 which, in turn, claims the benefit of U.S. Provisional Patent Application 62/181,226, entitled "High Temperature Three-Dimensional Printing Compositions", filed on Jun. 18, 2015, the disclosures of which are hereby incorporated in their entirety by reference thereto.

1. FIELD OF THE INVENTION

This invention relates to thermosetting resin compositions that are useful as high performance and high temperature three-dimensional ("3-D") printing materials suitable for objects requiring temperature performance >100 C but can be cured at room temperature by photo polymerization or other low temperature curing methods.

2. DESCRIPTION OF THE PRIOR ART

3-D printing technology, including materials, printers and software, continue to advance as digital manufacturing is expected to grow. This shift of digital manufacturing would be an alternative to traditional manufacturing with a fraction of cost. Two powerful technology trends, 3-D printing and cloud computing, are coming together to bring low cost manufacturing bases to the United States and other advanced countries. Small companies implementing 3-D printing technology would more readily be capable of getting into the manufacturing business without the need for large capital investment.

Additive manufacturing process ("AM") defines a process wherein digital 3-D design data is utilized to deposit materials one layer at a time to build up a component. The term "3-D printing" is frequently used as a synonym for AM. 3-D printing techniques are considered AM processes because they involve the application of successive layers of materials. Current commercial 3-D printers can selectively extrude thermoplastic, cure photosensitive resins, and sinter metallic, ceramic or polymer powders can be drawn with a computer-aided design program. The material selection combined with hardware (printer) and software is key for rapid prototyping and cost effective manufacturing. Thermoset materials used in 3-D printing often require curing and post curing. Extrusion printer technology forces thermoplastics through a heated zone to build 3-D structures. 3-D printing structures are frequently formed using Stereolithographic technology (SLA or SL; also known as optical fabrication, photo-solidification, solid free-form fabrication, solid imaging and Resin printing), producing models, prototypes, patterns, and production parts. Stereolithography is an AM process that uses photosensitive thermoset resins or photo-reactive resins that are cured with a UV laser or similar power source. However, this process has been found to be too slow and expensive for 3-D printing and is not compatible with compositions that contain light-scattering particles fillers, pigment, waxes etc.

Most thermosetting 3-D printing materials today cannot tolerate high temperature. Materials typically used include UV curable epoxy resins, acrylate resins, elastomeric rubber materials, polybutadine, polyester acrylate resins, to name a few. 3-D objects from these materials cannot stand high temperature and therefore, the objects and scope of uses thereof are vastly limited.

Various examples of thermosetting 3-D printing materials heretofore disclosed and utilized are provided below:

U.S. Pat. No. 8,603,612 to Chopra, et al. discloses curable, phase-change compositions and inks used for printing three-dimensional objects including a curable monomer, a photo-initiator, a wax and a gellant, where the composition of the cured formulation has a room temperature modulus of from about 0.01 to about 5 Gpa. The curable monomer includes acrylic monomer, polybutadiene adducted with maleic anhydride, aliphatic urethane acrylate, polyester acrylate, 3-acryloxypropyltrimethoxysilane, or acryloxypropyl t-structured siloxane.

U.S Pat. App. No. 2014/0065378 to Xu discloses color stable inks and applications thereof for use with a 3D printer. In some embodiments, an ink comprises a polymerizable material and a reactive wax comprising a saturated alkyl moiety bonded to an ethyleneically unsaturated moiety through a urethane, urea, ester, or carbonate ester linkage, wherein the ink is free or substantially free of non-reactive wax.

U.S Pat. App. No. 2014/0239527 to Lee discloses a light-curable viscous mixture that includes: 0-50% by weight of a poly(methyl methacrylate)/methyl methacrylate solution; 5-20% by weight of at least one kind of multifunctional aliphatic (meth)acrylate; 5-40% by weight of at least one kind of aliphatic urethane (meth)acrylate oligomer; 25-65% by weight of at least one kind of difunctional bisphenol-A dimethacrylate; 0.1 to 5% by weight of at least one kind of a photo-initiator; 0.05 to 2% by weight of at least one kind of light stabilizer; and 0.1 to 3% by weight of color pigment based on the total weight of the composition.

U.S Pat. App. No. 2015/0064299 to Koreis discloses three dimensional printing of parts, including a parts library, a database, and a parts management system. The parts library is configured to store a plurality of part definition files. The database is configured to store entries identifying a printing of parts using the plurality of part definition files. The parts management system is configured to receive a request for a part definition file in the parts library, identify the part definition file in the plurality of part definition files in the parts library, receive an indication of a printing of a part using the part definition file, and store an entry identifying the printing of the part using the part definition file in the database.

WIPO Pat. App. WO2014/077848 to Ganapathiappan, et al. discloses a composition for three-dimensional printing that includes a liquid, curable, cross-linkable monomer, solid thermoplastic particles mixed with the liquid, curable, cross-linkable monomer, and a light sensitive initiator mixed with the liquid, curable, cross-linkable monomer. The solid thermoplastic particles have a size ranging from about 200 nm to about 50 μm.

WIPO Pat. App. WO2012015604 to Tran discloses a solvent-free thermosetting resin composition including a benzoxazine component, a liquid epoxy compound and a toughening agent comprising a phenol-terminated polyurethane, polyurea or polyurea-urethane. The solvent-free thermosetting resin composition, upon curing, provides a cured product exhibiting improved thermal and physical properties, and is therefore useful in high temperature applications in various industries, such as in the aerospace, automotive and rail industries. There is no disclosure with regard to rapid cure at low temperature, which is essential for 3-D printing cost effective applications There remains a need in the art for high temperature resins for three-dimensional printing compositions that yield 3-D objects suitable for high heat applications. Particularly needed in the art are thermal resins for high heat 3-D applications that are more cost effective to manufacture and have efficient reaction and formation times suitable for manufacture.

SUMMARY OF THE INVENTION

The present invention provides high temperature three-dimensional printing compositions that are cost effective to manufacture and have efficient reaction and formation times especially well suited for manufacture of 3-D objects used at high temperatures. The thermosetting resin compositions of the subject invention provide high temperature compositions using Cyanate esters, Bismaleimide, Benzoxazine, polyimide, Phthalonitrile resin (PN), Bismaleimide-Triazine (BT), Cyanate ester epoxy blends, allyl group containing Polyphenylene ether or oxide (PPE/PPO) silicone resins and mixtures thereof. The thermosetting resin compositions further address low or room temperature curing temperatures of the compositions to adapt to current 3-D printing hardware, and followed by further curing the object in a free standing oven to achieve high Tg or a high ultimate use temperature.

Typical thermosetting 3-D printing materials are made with UV curable epoxy resins, acrylate resins, elastomeric rubber materials, polybutadiene, polyester acrylate, etc. However, none of the current thermoset materials can effectively tolerate high temperature use over extended periods of time and therefore cannot be utilized for 3-D objects that are subjected to high temperature utility. The present invention addresses the utility of high temperature usage of 3-D printing materials. Many applications such as, including but not limited to: aerospace engine blades, missile cones, radomes, satellite structures, automotive parts (such as muffler, and/or parts close to the engine), oil & gas, aircraft ducting systems, high temperature printed circuit boards, chip mounting, robotic hands, molding compounds for electric cars, battery storage enclosures of electric cars, high temperature molds to make tap faucets, air-condition vents, require parts that are capable of withstanding high temperatures (>150° C.) for extended periods of time.

A high performance and high temperature resin composition for three dimensional printing is provided that is formed from a two stage cure. The first stage cure may be ultraviolet radiation (UV), cationic, electron beam (EB), laser, peroxide, and/or chemical additive cure. The second stage cure is preferably a thermal post cure to finish curing the resin.

The resin composition preferably comprises a first stage curable group (Component A), a second stage curable group cured by thermal/heat cure (Component B), a photo-initiator, and a thermal catalyst. The resin composition's Component A may be selected from a photo-curable group, a peroxide curable group, an EB curable group, and/or a cationic curable group. Component A may be selected from a group consisting of vinyl, acrylate, methacrylate, and acrylonitrile. Alternatively, Component A may be selected from a group consisting of monomers, oligomers, and polymers. Component B is preferably a cyanate ester, isocyanate, Benzoxazine, polyimide, Bismaleimide, Phthalonitrile resin (PN), Bismaleimide-Triazine (BT), epoxy, silicone resins, epoxy-cyanate and mixture thereof.

In an alternative embodiment, Component A may further comprise a second reactive group. The second reactive group is preferably selected from a group consisting of OH, NH, SH, COOH, epoxy, amine and anhydride. This second reactive group is capable of reacting with Component B.

In a further alternative embodiment component A may be Cyanate ester with a photocurable group.

Components A and B can be pre-reacted to generate a high viscosity material that at elevated temperatures has a viscosity suitable for three-dimensional printers. Following pre-reaction a polymerization initiator is preferably added. Also, an optional thermal catalyst may be added.

In another embodiment, Component A comprises an elastomeric material that reacts with special aromatic amines to initiate reaction at room temperature or react with Cyanate ester or Isocyanate to cure at room temperature. The first stage curing of the material provides a non-melting gummy to solid material that can be thermally post-cured in an oven to give solid materials with high glass transition temperatures.

Preferably, the resin composition's Component A makes up between 10-90%; Component B makes 10-90% of the composition. Photo-initiator and catalyst are used in the range of 0.1-10%. An Ionic liquid catalyst may be used in the range of 0.3-5%.

Resultant resin compositions preferably have a Tg of the final product after post cure >200° C. and high modulus. Alternatively, resultant resin compositions preferably have a Tg >300° C. with high elongation.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
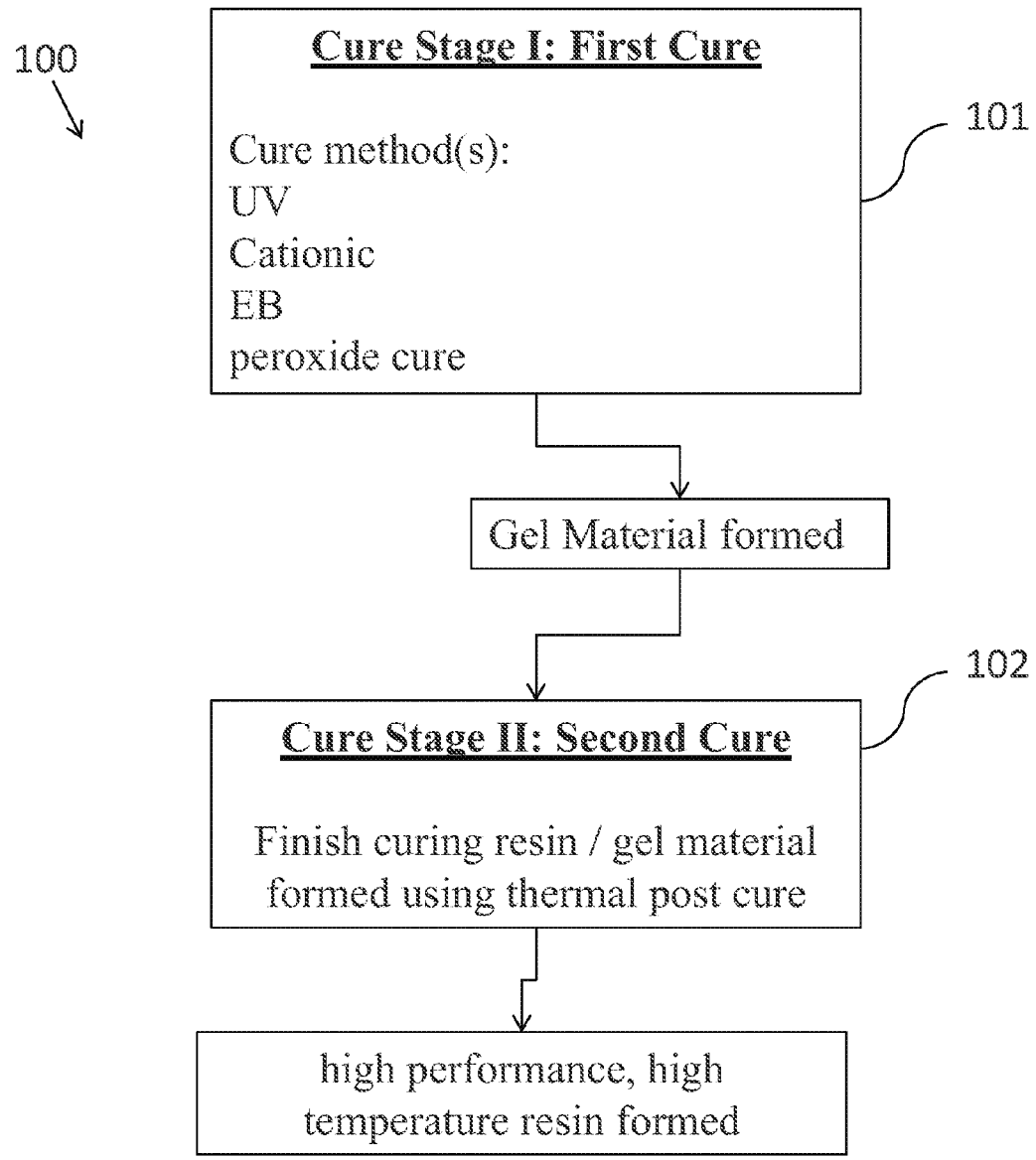
FIG. 1 illustrates a flow chart showing the general process steps in formation of the thermosetting resin compositions.

The subject invention provides thermosetting resin compositions having applications as high performance and high temperature 3-D printing materials. The thermosetting resin compositions are suitable for any object that requires thermal performance >100° C. but can be cured at room temperature by photo-polymerization or other low temperature curing methods.

Most of thermosetting 3-D printing materials today are made with UV curable epoxy resins, acrylate resins, elastomeric rubber materials, polybutadiene, polyester acrylate, etc. However, none of the current thermoset materials can effectively tolerate high temperature use over extended periods of time and therefore cannot be utilized for 3-D objects that are subjected to high temperature utility. The present invention addresses the utility of high temperature usage of 3-D printing materials. Many applications such as, including but not limited to: aerospace engine blades, automotive parts (such as muffler, and/or parts close to the engine), oil and gas, aircraft ducting systems, high temperature printed circuit boards, chip mounting, robotic hands, molding compounds for electric cars, battery storage enclosures of electric cars, high temperature molds to make tap faucets, air-condition vents, require parts that are capable of withstanding high temperatures (>150° C.) for extended periods of time.

The thermosetting resin compositions of the subject invention provide high performance, high temperature compositions using Cyanate esters, Bismaleimide, benzoxazine, polyimide, Phthalonitrile resin (PN) and silicone resins. The thermosetting resin compositions further address low or room temperature curing temperatures of the compositions to adapt to current 3-D printing hardware, and followed by further curing the object in a free standing oven to achieved high Tg or a high ultimate use temperature. Preferably, the first stage and second stage cure is completed in a time period of less than 5 minutes.

The thermosetting resin compositions of the subject invention can be utilized with Stereolithographic apparatus' ("SLA"; See U.S. Pat. No. 5,236,637), Selective laser Sintering (SLS), Multijet and Continuous liquid Interface Production ("CLIP-US"; See U.S. Patent No. 2015/0097315) and combinations of processes thereof to make 3-D structures and parts.

In another embodiment, the subject resin composition is formulated with carbon, glass, synthetic fiber of high tensile strength (such as that sold under the trade name Kevlar from DuPont), ultra-high-molecular-weight polyethylene (UHMWPE) fiber (such as that sold under the trade name Spectra from Honeywell), and/or other fibers to make composite parts.

The subject resin composition may be formulated with pigment, coloring, light sensitive conductive materials, amorphous thermoplastic polyetherimide (PEI) resins (such as that sold under the trade name Ultem from Sabic), Polyethylene terephthalate (PET), and flame retardant additives.

In another embodiment the subject resin composition is formulated with carbon, glass and/or synthetic fiber of high tensile strength (such as that sold under the trade name Kevlar from DuPont) and flame retardant materials suitable of structural composites with excellent mechanical and thermal properties and conforming to flammability requirements of 14 CFR Part 25.853 and finished parts compliance with smoke density (Ds) requirements of 14 CFR part 25.853(d) [for example: 14 CFR Ch. I (1-1-12 Edition)(b) Acceptance Criteria. The specific optical smoke density (Ds), which is obtained by averaging the reading obtained after 4 minutes with each of the three specimens, shall not exceed 200; See 14 CFR Ch. I (1-1-12 Edition) found at http://www.gpo.gov/fdsys/pkg/CFR-2012-title14-vol1/pdf/CFR-2012-title14-vol1-part25-appF.pdf].

For example, 14 CFR Part 25.853 currently requires, inter alia, compartment materials for Aeronautics and Space via: Material Test Criteria-(1) interior compartment occupied by crew or passengers. (i) interior ceiling panels, interior wall panels, partitions, galley structure, large cabinet walls, structural flooring, and materials used in the construction of stowage compartments (other than under seat stowage compartments and compartments for stowing small items such as magazines and maps) must be self-extinguishing when tested vertically in accordance with the applicable portions of the regulation. The average burn length may not exceed 6 inches and the average flame time after removal of the flame source may not exceed 15 seconds. Drippings from the test specimen may not continue to flame for more than an average of 3 seconds after falling. See 14 CFR 25.853—compartment interiors, found at http://www.gpo.gov/fdsys/granule/cfr-1999-title14-vol1/cfr-1999-title14-vol1-sec25-853/content-detail.html, for example. The composition has particular application for use in aircraft ducting, oil tank, water tank, waste tank and toilet structures. Preferably, the resin composition has a Tg >300 C so that it can be used with fibers for racing car body parts, and/or for use in high temperature composites wheels.

The resin may include Phthalonitrile resin (PN) or modified PN resin as component B and silica used in encapsulation application for power devices. The resin composition may include epoxy hardeners/polyurethane chain extenders for advanced two component polyurethane cast and spray applications, such as that sold under the trade name Lonzacure from Lonza (M-DEA, M-MIPA, CAF, M-CDEA) for use in semiconductor polishing pad applications. Component B may be Cyanate esters with low dielectric properties for use in flexible and rigid circuit (PCB) boards applications.

FIG. 1 illustrates a flow chart showing the general process steps in formation of the thermosetting resin compositions, shown generally at 100. A high performance and high temperature resin composition for three dimensional printing is provided that is formed from a two stage cure. The first stage cure 101 may be ultraviolet radiation (UV), cationic, electron beam (EB), peroxide, and/or chemical additive cure. The second stage cure 102 is preferably a thermal post cure to finish curing the resin. The resin composition preferably comprises a first stage curable group (Component A), a second stage curable group cured by thermal/heat cure (Component B), a photo-initiator, and a thermal catalyst. The resin composition's Component A may be selected from a photo-curable group, a peroxide curable group, an EB curable group, and/or a cationic curable group. Component A may be selected from a group consisting of vinyl, acrylate, methacrylate, and acrylonitrile. Alternatively, Component A may be selected from a group consisting of monomers, oligomers, and polymers. Component B is preferably a cyanate ester, isocyanate, benzoxazine, polyimide, Phthalonitrile resin (PN), bismaleimide, silicone resin, BT, epoxy and mixture thereof.

In an alternative embodiment, Component A may further comprise a second reactive group. The second reactive group is preferably selected from a group consisting of OH, NH, SH, COOH, epoxy, amine and anhydride. This second reactive group is capable of reacting with Component B.

Components A and B can be pre-reacted to generate a high viscosity material that at elevated temperatures has a viscosity suitable for three-dimensional printers. Following pre-reaction a polymerization initiator is preferably added. Also, an optional thermal catalyst may be added.

In another embodiment, Component A comprises an elastomeric material that reacts with special aromatic amines to initiate reaction at room temperature or react with Cyanate ester or Isocyanate to cure at room temperature. The first stage curing of the material provides a non-melting gummy to solid material that can be thermally post-cured in an oven to give solid materials with high glass transition temperatures.

Preferably, the resin composition's Component A makes up between 10-90%; Component B makes 10-90% of the composition. Photo-initiator and catalyst are used in the range of 0.1-10%. An ionic liquid catalyst may be used in the range of 0.3-5%.

Resultant resin compositions preferably have a Tg of final product after post cure >200° C. and high modulus. Alternatively, resultant resin compositions preferably have a Tg >300° C. with high elongation.

Figure 2:
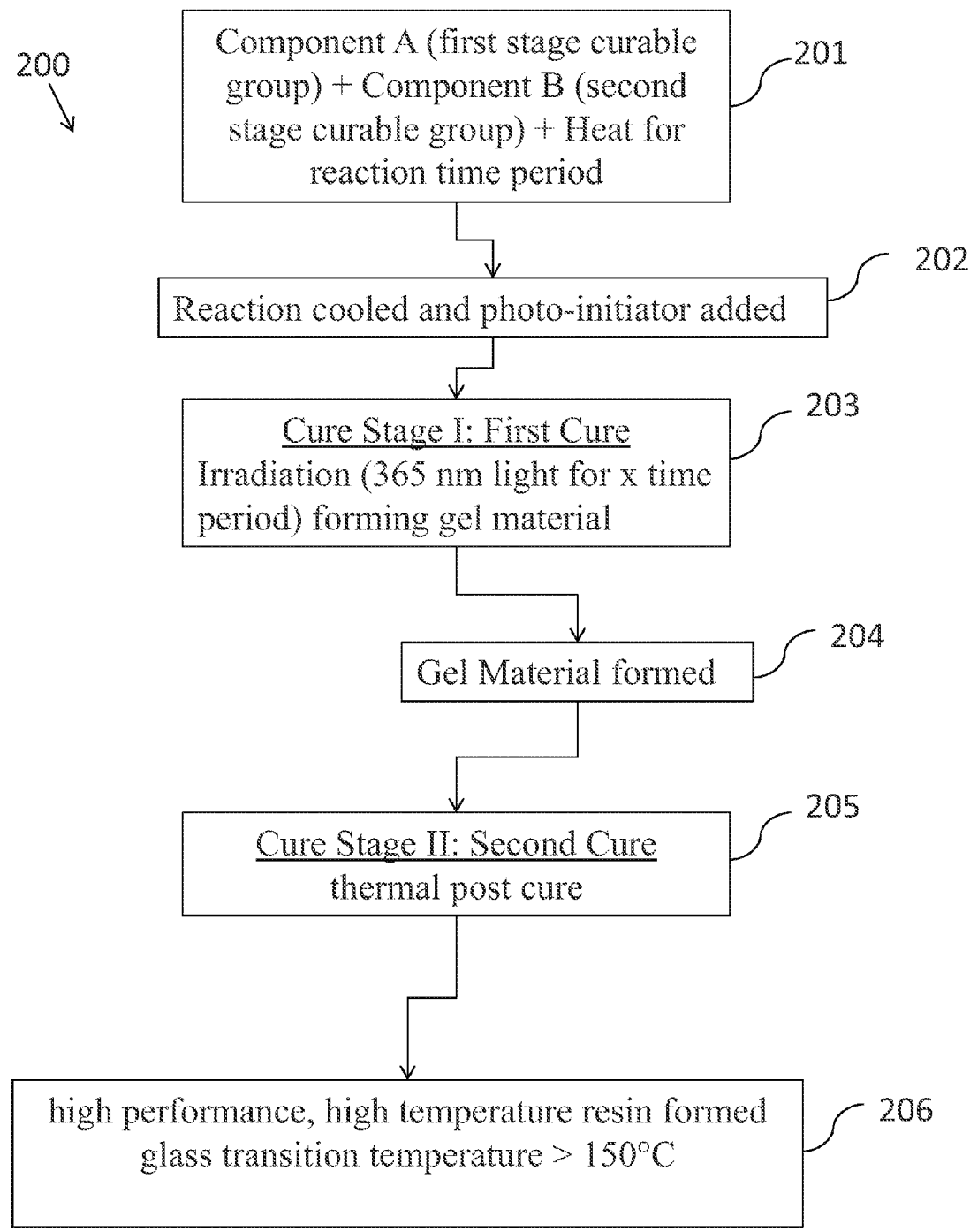
FIG. 2 illustrates a flow chart in formation of an embodiment of a thermosetting resin composition.

FIG. 2 illustrates a flow chart in formation of an embodiment of a thermosetting resin composition, shown generally at 200. At 201, Component A (first stage curable group) and Component B (second stage curable group) are heated for a reaction time period until the reaction is deemed complete. [See Example 1 below: 2,2-bis (4-Cyanatophenyl) isopropyidene (Primaset® BADCy (Lonza) (70%) [Component B] and acrylate epoxy resin (30% from Archema) [Component A] were reacted at 150° C. for 45 min. The reaction is cooled and photo-initiator added at 202. Upon cooling a photo-initiator (Irgacure 2022) was added (0.3-3%). At 203 the Cure Stage I: First Cure is initiated by way of Irradiation (365 nm light for x time period) forming a gel material 204. This resin can achieve hard cure with irradiation of 365 nm light for 15 min. At 205 the Cure Stage II: Second Cure is initiated by thermal post cure. The UV cured material/gel 204 is post cured (2 hours at 150° C. and 1 hour at 210° C.) to generate a material with glass transition temperature of 201° C. A high performance, high temperature resin formed is formed at 206, having a glass transition temperature >150° C. so that the resin can be utilized to form high temperature tolerant objects for high heat applications.

Examples 1-21

The following examples are presented to provide a more complete understanding of the invention. The specific techniques, conditions, materials, proportions and reported data set forth to illustrate the principles and practice of the invention are exemplary and should not be construed as limiting the scope of the invention.

Example 1

70 wt. % 2,2-Bis(4-cyanatophenyl)propane (Primaset BADCy from Lonza) and 30 wt. % acrylated epoxy resin (cn104z from sartomer) were reacted at 150° C. for 45 min. Upon cooling a photo-initiator (Irgacure 2022 from BASF) was added (3 wt. %). This resin achieve hard cure with irradiation of 365 nm light for 15 min. This UV cured material can be further post cured (2 hours at 150° C. and 1 hour at 210° C.) to generate a material with glass transition temperature of 201° C.

Example 2

70 wt. % 2,2-Bis(4-cyanatophenyl)propane (Primaset BADCy from Lonza) and 30 wt. % acrylated epoxy resin (cn104z from sartomer), 0.64 wt. % Novocure-200 (available from Novoset LLC) and a photo-initiator 0.33 wt. % (Irgacure 819 from BASF) were combined and warmed to 90° C., the mixture was irradiated at 365 nm for 30 min to achieve a hard cure. This material can be post cured thermally (20 min at 150° C.) to generate a material with a high Tg 236° C.

Example 3

70 wt. % 2,2-Bis(4-cyanatophenyl)ethane (Primaset LECY from Lonza) and 30 wt. % acrylated epoxy resin (cn104z from sartomer) and a photo-initiator 0.63% (Irgacure 2022 from BASF) were mixed and irradiated at 365 nm for 1 hour to give a tacky gelled material. This material is further cured thermally to produce a solid material with a tan d above 316° C.

Example 4

70 wt. % 2,2-Bis(4-cyanatophenyl)ethane (Primaset LECY from Lonza) and 30 wt. % acrylated epoxy resin (cn154 from Sartomer) were blended with a photo-initiator 3.0 wt. % (Irgacure 2022 from BASF). Irradiation at 365 nm light provides a hard cured resin that is post cured thermally to give a material with a tan d of 221° C.

Example 5

35 wt. % 1,1-Bis(4-cyanatophenyl)ethane (Primaset LECy from Lonza), 35 wt. % Phthalonitrile resin and 30 wt. % acrylate epoxy resin (cn104z from Sartomer) were combined and heated to mix together. A photo-initiator 3.0 wt. % (Irgacure 2022 from BASF) was added to give a material with a viscosity of 9050 mPa*s at 60° C. This resin can be hard cured with irradiation of 365 nm light for 15 min. This material can be further post cured to give a hard material with at Tg=172° C.

Example 6

56 wt. % Polyphenol cyanate ester (Primaset PT-30 from Lonza), 22.75 wt. % acrylated epoxy resin (cn104z from Sartomer), 19.81 wt. % 2-(methacryloyloxy)ethyl acetoacetate (AAEMA from Lonza) were warmed together and mixed. 3.37 wt. % photo-initiator (Irgacure 2022 from BASF) was added to give a material with a viscosity=3130 mPa*s at 30° C. This material could be photo-cured and then thermally post cured (2 hours at 150° C.; 2 hours at 235° C., 1 hour at 250° C.) to give a Tg=238° C.

Example 7

61 wt. % 1,1-Bis(4-cyanatophenyl)ethane (Primaset LECy from Lonza) and 39 wt. % modified polyphenylene oxide (SA-9000 from Sabic) was warmed to 95° C. and mixed until homogenous. This mixture gave a viscosity of 1905 mPa*s at 95° C. To this mixture was added 3% photo-initiator (Igracure 2022 from BASF), the mixture was then exposed to 365 nm light and cured to give a solid material.

Example 8

60 wt. % 2,2-Bis(4-cyanatophenyl)propane (Primaset BADCy from Lonza) and 40 wt. % modified polyphenylene oxide (SA-9000 from Sabic) was warmed to 95° C. and mixed until homogenous. This mixture gave a viscosity of 4885 mPa*s at 95° C. To this mixture was added 3% photo-initiator (Igracure 2022 available from BASF, the mixture was then exposed to 365 nm light and cured to give a solid material.

Example 9

57 wt. % 1,1-Bis(4-cyanatophenyl)ethane (Primaset LECy from Lonza) and 23 wt. % modified bismaleimide (BMPI) were warmed and stirred until homogenous. To this was added 21 wt. % modified vinyl ester resin (polylite 35070-00 from Reichhold) this was mixed until homogenous and gave a viscosity of 379 mPa*s at 40° C. To this mixture was added 3.41% photo-initiator (Irgacure 2022 from BASF) and the mixture was irradiated for 30 min at 365 nm to cure. This was post cured (2 hours at 150° C.; 2 hours at 235° C.) to give a material with a Tg=235° C.

Example 10

95 wt. % 1,1-Bis(4-cyanatophenyl)ethane (Primaset LECy from Lonza) and 5 wt. % Lonzacure CAF (from Lonza) were combine and gently warmed to 70° C. to dissolve the Lonzacure. This gave a mixture with a viscosity of 46.24 mPa*s at 40° C. This material was cured at 120° C. for 1 hour and 10 min to give a solid material. Post-curing (2 hours at 150° C.; 2 hours at 235° C.) of this material gave a Tg=301° C.

Example 11

95 wt. % 1,1-Bis(4-cyanatophenyl)ethane (Primaset LECy from Lonza) and 5 wt. % Lonzacure m-DEA (from Lonza) were combine and gently warmed to 70° C. to dissolve the Lonzacure. This gave a mixture with a viscosity of 39.02 mPa*s at 40° C. This material was cured at 120° C. for 15 min to give a solid material. Post-curing (2 hours at 150° C.; 2 hours at 235° C.) of this material gave a Tg=279° C.

Example 12

95 wt. % 1,1-Bis(4-cyanatophenyl)ethane (Primaset LECy from Lonza) and 5 wt. % Lonzacure m-mipa (from Lonza) were combine and gently warmed to 70° C. to dissolve the Lonzacure. This gave a mixture with a viscosity of 50.26 mPa*s at 40° C. This material was cured at 120° C. for 15 min to give a solid material. Post-curing (2 hours at 150° C.; 2 hours at 235° C.) of this material gave a Tg=267° C.

Example 13

43 wt. % 2,2-Bis(4-cyanatophenyl)propane (Primaset BADCy from Lonza), 12 wt. % hydroxyl terminated-polycaprolactone (CAPA-2100 from Perstorp) and 41 wt. % modified vinyl ester resin (polylite 35070-00 from Reichhold) were combined and warmed to mix. This gave a material with a viscosity of 3345 mPa*s at 95° C. To this was added 3 wt. % photo-initiator (Irgacure 2022 from BASF) and the material was irradiated at 365 nm to give a solid material. The material was post-cured (2 hours at 150° C.; 2 hours at 235° C.) to give Tg=166° C.

Example 14

47 wt. % HTL-300 (from Lonza), 34 wt. % modified vinyl ester resin (polylite 35070-00 from Reichhold) and 18 wt. % 1,1-Bis(4-cyanatophenyl)ethane (Primaset LECy from Lonza) were combined and warmed to mix. This gave a material with a viscosity of 172 mPa*s at 95° C. To this was added 3 wt. % photo-initiator (Irgacure 2022 from BASF) and the material was irradiated at 365 nm to give a solid material. The material was post-cured (2 hours at 150° C.; 2 hours at 235° C.) to give Tg=166° C.

Example 15

41 wt. % Multi-functional cyanate ester resin (Primaset PT-15 from Lonza), 19 wt. % bisphenol F epoxy resin (PY306) and 31 wt. % polyphenol phosphate (AFLAMMIT PLF-140 from THOR) are warmed to 60° C. and mixed to form a homogenous resin material.

Example 16

57 wt. % Polyphenyl cyanate resin (Primaset PT-15 from Lonza), 19 wt. % bisphenol A epoxy resin (GY240, from Huntsman) and 8 wt. % polyphenol phosphate (Fyrol PMP, From ICL) and 16 wt. % cyclic anhydride (MTHPA, from Broadview Technologies) are warmed to 60° C. and mixed to form a homogenous resin material.

Example 17

49 wt. % Polyphenyl cyanate ester resin (Primaset PT-30, from Lonza), 25 wt. % aliphatic epoxy (heloxy 68, from Momentive), 25 wt. % cyclic anhydride (MTHPA, from broadview technologies) were mixed at room temperature to give a homogenous resin having viscosity as low as 137.71 mPa*s at 40 C.

Example 18

37 wt. % Polyphenyl cyanate ester resin (LVT-50, from cyalume), 19 wt. % modified bisphenol A epoxy (RIMR 935, From Momentive), 37 wt. % polyphosphazene (SPB-100, from Otsuka), 6 wt. % aliphatic amine (RIMR 936H, from Momentive). Warm to 50° C. and mix to form a homogenous resin.

Example 19

36 wt. % Polyphenyl cyanate ester resin (Primaset PT-30, from Lonza), 13 wt. % modified bisphenol A epoxy (RIMR 935 from Momentive), 12 wt. % cyclic anhydride (MTHPA, from Broadview technologies) and 39 wt. % bismaleimide resin were warmed to 90° C. and mixed give a homogenous resin having viscosity as low as 712 mPa*s at 40° C.

Example 20

Part A: 50 wt. % 1,1-Bis(4-cyanatophenyl)propane (Primaset BADCy from Lonza) and 50 wt. % methylene diphenyl diisocyanate prepolymer (Rubinate M, from Huntsman) was warmed to 95° C. and mixed until homogenous.
Part B: 85.17 wt. % Linear hydroxylated polybutadiene (LBH-2000P, from Total) and 14.83 wt. % Lonzacure m-Mipa 2.2510 g (from Lonza) were combined and warmed to make homogenous.
These solutions Part A and Part B were mixed in a 66.13% and 33.87% respectively at room temperature. The mixture reacted at room temperature to form a gummy material that can then be post cured.

Example 21

72 wt. % 1,1-Bis(4-cyanatophenyl) ethane (Primaset LECy from Lonza, 72%) and 28 wt. % (3',4'-Epoxycyclohexane)methyl 3,4-epoxycyclohexylcarboxylate (Celloxide 2021P from Diacel, 28%) were combined and mixed until homogenous at room temperature to give a viscosity of 34.45 mPa*s at 40° C. To this was added 3 wt % of Irgacure 250 and the solution was irradiated to give a cured material. This cured material could be further post cured to achieve high Tg.
This gave a mixture with a viscosity of 50.26 mPa*s at 40 C. This material was cured at 120 C for 15 min to give a solid material. Post-curing (2 hours at 150° C.; 2 hours at 235° C.) of this material gave a Tg=267° C.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A high performance and high temperature resin composition for three dimensional printing formed from a two stage cure comprising a first stage curable group (Component A), a second stage curable group cured by thermal/heat cure (Component B); wherein Component A is selected from a photo-curable group, a peroxide curable group, an electron beam (EB) curable group, a cationic curable group, an IR curable group, an addition cure group, a condensation reactive group, and/or a chemical additive curable group; wherein Component A further comprises a second reactive group pre-reacted with Component B to generate a homogenous resin at room temperature having viscosity as low as about 100 mPA*s and suitable for three-dimensional printers; wherein Component B is selected from a cyanate ester, bismaleimide (BMI), benzoxazine, polyimide, phthalonitrile resin (PN), bismaleimide triazine (BT), silicone resin, epoxy, cyanate epoxy and mixtures thereof.

2. The resin composition of claim 1, wherein said viscosity ranges from about 100 mPa*s to 100000 mPa*s at room temperature.

3. The resin composition of claim 1, wherein said viscosity ranges from about 34 mPa*s to 712 mPa*s at 40° C.

4. The resin composition of claim 1, wherein said viscosity ranges from about 172 mPa*s to 9050 at 90° C.

5. The resin composition of claim 1, wherein the first stage cure comprises ultraviolet radiation (UV) or cationic cure, electron beam (EB), Infrared (IR), addition cure, condensation reaction, peroxide cure or chemical additives.

6. The resin composition of claim 5, wherein a gel material is formed after said first stage cure and wherein after said second stage cure said high performance and high temperature resin composition is formed.

7. The resin composition of claim 1, wherein the second stage cure is a thermal post cure to finish curing the resin.

8. The resin compositions of claim 1, wherein the second stage cure is affected in a microwave oven to finish the cure in a few seconds.

9. The resin composition of claim 1 comprising a photo-initiator and, optionally, a thermal catalyst.

10. The resin composition of claim 1, wherein Component A is selected from a group consisting of vinyl, acrylate, methacrylate, and acrylonitrile.

11. The resin composition of claim 1, wherein Component A is selected from a group consisting of monomers, oligomers, and polymers.

12. The resin composition of claim 1, wherein the second reactive group is selected from a group consisting of OH, NH, SH, COOH, epoxy, amine and anhydride.

13. The resin composition of claim 1, wherein the cyanate ester may contain a photo curable group.

14. The resin composition of claim 1, wherein following pre-reaction a polymerization initiator is added.

15. The resin composition of claim 14, wherein an optional thermal catalyst is added.

16. The resin composition of claim 1, wherein Component A comprises an elastomeric material that reacts with special aromatic amines to initiate reaction at room temperature or react with cyanate ester to cure at room temperature.

17. The resin composition of claim 1, wherein first stage curing of the material provides a non-melting gummy to solid material that can be thermally post-cured in an oven to give solid materials with high glass transition temperatures.

18. The resin composition of claim 1, wherein Component A makes up between 10-90%; Component B makes up between 10-90%.

19. The resin composition of claim 1, wherein photo-initiator and catalyst are used in the range of 0.1-10%.

20. The resin composition of claim 1, wherein component B comprises cyanate esters with low dielectric properties suitable for use in flexible and rigid circuit (PCB) boards applications.

21. The resin composition of claim 1, wherein an ionic liquid catalyst is used in the range of 0.3-5%.

22. The resin composition of claim 1 having a Tg >200° C. and high modulus after post cure.

23. The resin composition of claim 1 having a Tg >300° C. with high elongation after post cure.

24. The resin composition of claim 1 comprising epoxy hardeners for use in semiconductor polishing pad applications.

25. The resin composition of claim 1 comprising a photo-initiator, and a thermal catalyst; wherein Component A is a photo-curable/peroxide curable/electron beam (EB)/or cationic curable group, and wherein Component B is a cyanate ester, unsaturated vinyl ester or vinyl ester hybrid, bismaleimide resin (BMI), polyimide, benzoxazine, phthalonitrile resin, silicone and epoxy.

26. The resin composition of claim 25, wherein following pre-reaction a polymerization initiator is added.

27. The resin composition of claim 26, wherein a thermal catalyst is added.

28. The resin composition of claim 1, wherein said first stage cure is carried out for x time period and said second stage cure is carried out for y time period; wherein x≤y and y is ≤about four hours; and wherein said resin composition has a Tg >150° after said second stage cure.

29. A high performance and high temperature resin composition for three dimensional printing formed from a two stage cure, comprising a first stage curable group (Component A), and a second stage curable group cured by thermal/heat cure (Component B); wherein Component A is selected from a photo-curable group, a peroxide curable group, a EB curable group, a cationic curable group, an IR curable group, an addition cure group, a condensation reactive group, and/or a chemical additive curable group; wherein Component A further comprises a second reactive group pre-reacted with Component B to generate a homogenous resin at room temperature having viscosity as low as about 100 mPA·s; wherein Component B is selected from a cyanate ester, bismaleimide (BMI), benzoxazine, polyimide, phthalonitrile resin (PN), bismaleimide triazine (BT), silicone resin, epoxy, cyanate epoxy and mixtures thereof; first stage cure is carried out for x time period and said second stage cure is carried out for y time period; wherein y is ≤about four hours.

30. The resin composition of claim 29, wherein said resin composition has a Tg >150° C. after said second stage cure.

31. The resin composition of claim 29, wherein x is ≤y.

* * * * *